(12) United States Patent
Nishijima (10) Patent No.: US 8,255,067 B2
(45) Date of Patent: Aug. 28, 2012

(54) PLANT OPERATION SYSTEM

(75) Inventor: Yasuyuki Nishijima, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 315 days.

(21) Appl. No.: 12/478,061

(22) Filed: Jun. 4, 2009

(65) Prior Publication Data

US 2010/0106264 A1 Apr. 29, 2010

(30) Foreign Application Priority Data

Oct. 24, 2008 (JP) ................................ 2008-274421

(51) Int. Cl.
*G05B 9/02* (2006.01)
*G06F 1/28* (2006.01)
(52) U.S. Cl. ........................................ 700/82; 700/286
(58) Field of Classification Search .................... 700/12, 700/15, 17, 19, 20, 82, 83, 286
See application file for complete search history.

(56) References Cited

U.S. PATENT DOCUMENTS

| | | | |
|---|---|---|---|
| 4,347,564 A * | 8/1982 | Sugano et al. | 700/3 |
| 4,500,951 A * | 2/1985 | Sugimoto et al. | 700/9 |
| 4,607,256 A * | 8/1986 | Henzel | 700/82 |
| 2008/0012679 A1 | 1/2008 | Okabe et al. | |

FOREIGN PATENT DOCUMENTS

| | | |
|---|---|---|
| JP | 62-206603 | 9/1987 |
| JP | 06-324702 | 11/1994 |
| JP | 2000-089819 A | 3/2000 |
| JP | 2000-235401 | 8/2000 |
| JP | 2001-117632 A | 4/2001 |
| JP | 2006-178730 | 7/2006 |
| JP | 2008-123118 A | 5/2008 |

OTHER PUBLICATIONS

Office Action dated Feb. 7, 2012 issued in a corresponding Japanese application, 3 pps.
Office Action dated Feb. 7, 2012 issued in a corresponding Japanese application with English language translations, 6 pps.

* cited by examiner

*Primary Examiner* — Charles Kasenge
(74) *Attorney, Agent, or Firm* — Buchanan Ingersoll & Rooney PC (57) ABSTRACT

An operation device position monitoring apparatus stores operation device position data outputted from the plant operation control system and the backup plant operation control system and further displays the operation device position data on a display device. Moreover, a processing device outputs a switching permission signal (Sk) to a switching device that performs switching from the plant operation control system to the backup plant operation control system when operation device position data outputted from the plant operation control system and operation device position data outputted from the backup plant operation control system are the same as each other, so that the operation device position is prevented from differing from the position upon normal operation when the plant operation control system is replaced by the backup plant operation control system.

7 Claims, 6 Drawing Sheets

| Tag. No | NAME | OPERATION DEVICE POSITION | |
|---|---|---|---|
| | | NORMAL | BACKUP |
| KIC11001 | PUMP A | ACTIVATE | ACTIVATE |
| KIC11002 | PUMP B | STOP | ACTIVATE |
| KIC11004 | VALVE A | OPEN | CLOSE |
| KIC11006 | VALVE B | CLOSE | CLOSE |

| Tag. No | NAME | OPERATION DEVICE POSITION | | DETERMINATION RESULT |
|---|---|---|---|---|
| | | NORMAL | BACKUP | |
| KIC11001 | PUMP A | ACTIVATE | ACTIVATE | OK |
| KIC11002 | PUMP B | STOP | ACTIVATE | NG |
| KIC11004 | VALVE A | OPEN | CLOSE | NG |
| KIC11006 | VALVE B | CLOSE | CLOSE | OK |

| Tag. No | NAME | OPERATION DEVICE POSITION | | DETERMINATION RESULT |
|---|---|---|---|---|
| | | NORMAL | BACKUP | |
| KIC11002 | PUMP B | STOP | ACTIVATE | NG |
| KIC11004 | VALVE A | OPEN | CLOSE | NG |

| Tag. No | NAME | OPERATION DEVICE POSITION | | DETERMINATION RESULT | IMPORTANCE LEVEL |
|---|---|---|---|---|---|
| | | NORMAL | BACKUP | | |
| KIC11002 | PUMP B | STOP | ACTIVATE | NG | RANK 1 |
| KIC11004 | VALVE A | OPEN | CLOSE | NG | RANK 1 |

| Tag. No | NAME | OPERATION DEVICE POSITION | | DETERMINATION RESULT | IMPORTANCE LEVEL |
|---|---|---|---|---|---|
| | | NORMAL | BACKUP | | |
| KIC11003 | PUMP C | ACTIVATE | STOP | NG | RANK 2 |
| KIC11005 | VALVE B | CLOSE | OPEN | NG | RANK 2 |

| Tag. No | NAME | OPERATION DEVICE POSITION | | DETERMINATION RESULT | IMPORTANCE LEVEL |
|---|---|---|---|---|---|
| | | NORMAL | BACKUP | | |
| KIC11011 | PUMP A | STOP | ACTIVATE | NG | RANK 3 |
| KIC11007 | VALVE C | OPEN | CLOSE | NG | RANK 3 |

PLANT OPERATION SYSTEM

BACKGROUND OF THE INVENTION

1. Field of the Invention

The present invention relates to a plant operation system that controls and monitors various kinds of plant apparatuses such as a nuclear plant and a power generation plant, and particularly to a plant operation system provided with a normal plant operation control system and a backup plant operation control system.

2. Description of the Related Art

Among conventional plant monitoring control systems, there exists a plant monitoring control system provided with a means that selectively displays a controlling status (a controlling state, a waiting state, a holding state, and the like) of a controller and the kind of a control subject (temperature control, pressure control, and the like) on a guidance display device in an operation apparatus so as to accurately comprehend the controlling status and the kind of a control subject (refer to Japanese Patent Application Laid-Open No. 2000-89819 (FIGS. 2, 4, and 8)).

Additionally, among conventional plant monitoring control systems, there exists a plant monitoring control system in which a common image is displayed on respective display screens formed on the front surface and the rear surface of a display device, by means of internal processing circuits for the display screens; and even in the case where the internal processing circuit for one of the display screens fails, monitoring of the same image and signal-input operation can continuously be performed by use of the other display screen; thus, mutual backup between the front and rear display screens can be performed (refer to Japanese Patent Application Laid-Open No. 2001-117632).

Additionally, among plant monitoring control systems, there exists an operation support system in which there are provided a transmission unit for performing communication with a teleconference system located in the vicinity of the apparatuses to be operated; a transmission unit for performing, through a communication network, communication with higher-hierarchy computers installed in a sales office, a control site, a backup control site, and the like; and a processing unit that implements data processing by means of a CPU (refer to Japanese Patent Application Laid-Open No. 2008-123118 (FIG. 8)).

In a conventional plant monitoring control system, there exists a backup plant operation control system configured for performing the backup for individual apparatuses and for displaying selectively; however, it is hardly considered to prepare a backup plant operation control system for a failure of a plant operation control system.

With regard to a plant operation system, it is important that a backup plant operation control system is provided in order to continue the operation of a plant in the case where a failure of a plant operation control system occurs during the operation of the plant.

In the case where, as described above, a backup plant operation control system is provided and a failure occurs in a plant operation control system during the operation of a plant, and then the plant operation control system is replaced by the backup plant operation control system, a position (activate/stop, open/close, or the like), of the operation device of a plant apparatus, which was ineffective when the normal plant operation control system was in an operation state may be effective in the backup plant operation control system. As described above, there has been a problem that, in the case where the plant operation control systems are changed, a position, of the operation device, which differs from the position when normal plant operation is performed becomes effective, a problem is posed while the plant is operated, for example, the output of the plant decreases.

SUMMARY OF THE INVENTION

The present invention has been implemented in order to solve the foregoing problems; the objective thereof is to obtain a plant operation system that can prevent the respective positions of the operation devices for a plant operation control system and a backup plant operation control system from differing from each other, in the case where the plant operation control system is replaced by the backup plant operation control system.

A plant operation system according to the present invention is provided with a plant operation control system that has a first plurality of operation devices for operating a plurality of plant apparatuses and outputs data on positions of the first plurality of operation devices; a backup plant operation control system that has a second plurality of operation devices for operating the plurality of plant apparatuses and outputs data on positions of the second plurality of operation devices; a switching device that performs switching between the plant operation control system and the backup plant operation control system; and an operation device position monitoring apparatus that receives data, on positions of the first or the second plurality of operation devices, which is outputted from the plant operation control system or the backup plant operation control system, respectively, and monitors statuses of the operation devices. The operation device position monitoring apparatus is provided with a storage unit that stores data on positions of the first and the second plurality of operation devices, a display device that displays data on positions stored in the storage unit, and a processing device that determines whether or not operation device position data from the plant operation control system is the same as operation device position data from the backup plant operation control system when the plant operation control system is replaced by the backup plant operation control system, and outputs a switching permission signal to the switching device in the case where the operation device position data from the plant operation control system and the operation device position data from the backup plant operation control system are the same as each other.

According to the present invention, it is made possible to comprehend in real time that the operation device position of the backup plant operation control system is different from the position upon normal operation; moreover, in the case where the operation device position differs from the position upon normal operation, the plant operation control system can be replaced by the backup plant operation control system after the position is made the same as the position upon normal operation by operating the operation device. As a result, it is made possible to prevent the operation device position from differing from the position upon normal operation when the plant operation control system is replaced by the backup plant operation control system; therefore, a problem that the plant operation is affected is eliminated.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
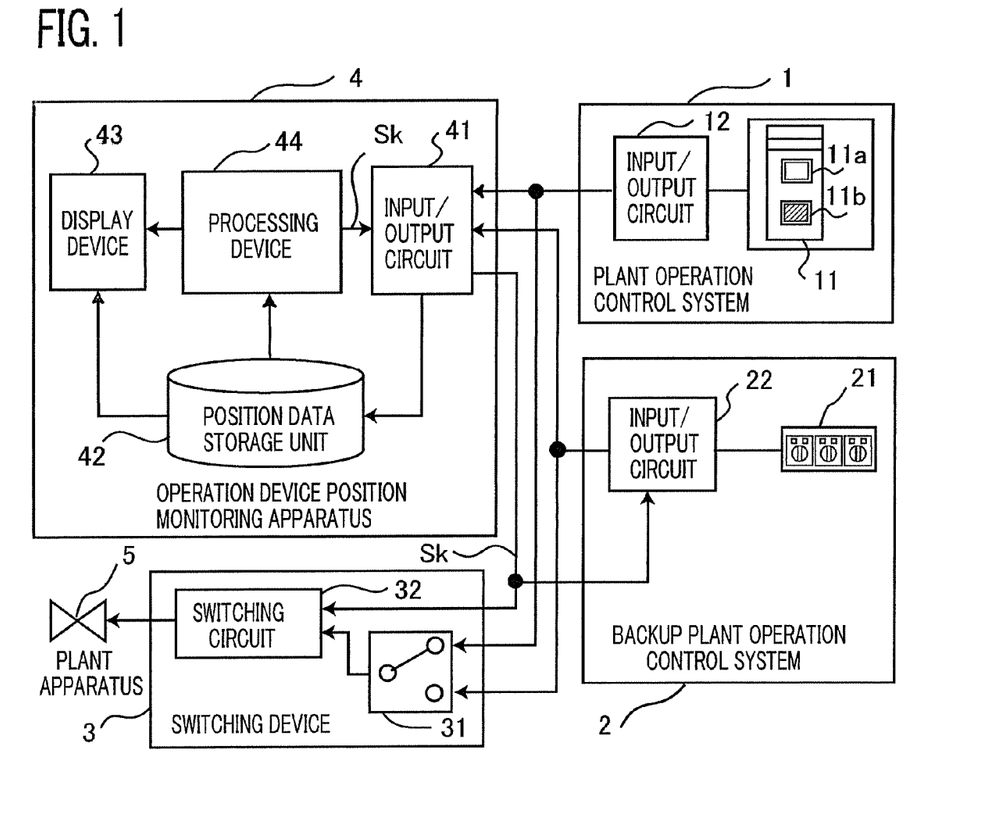
FIG. 1 is a diagram illustrating an overall configuration of Embodiment 1 of the present invention.
Figure 2:
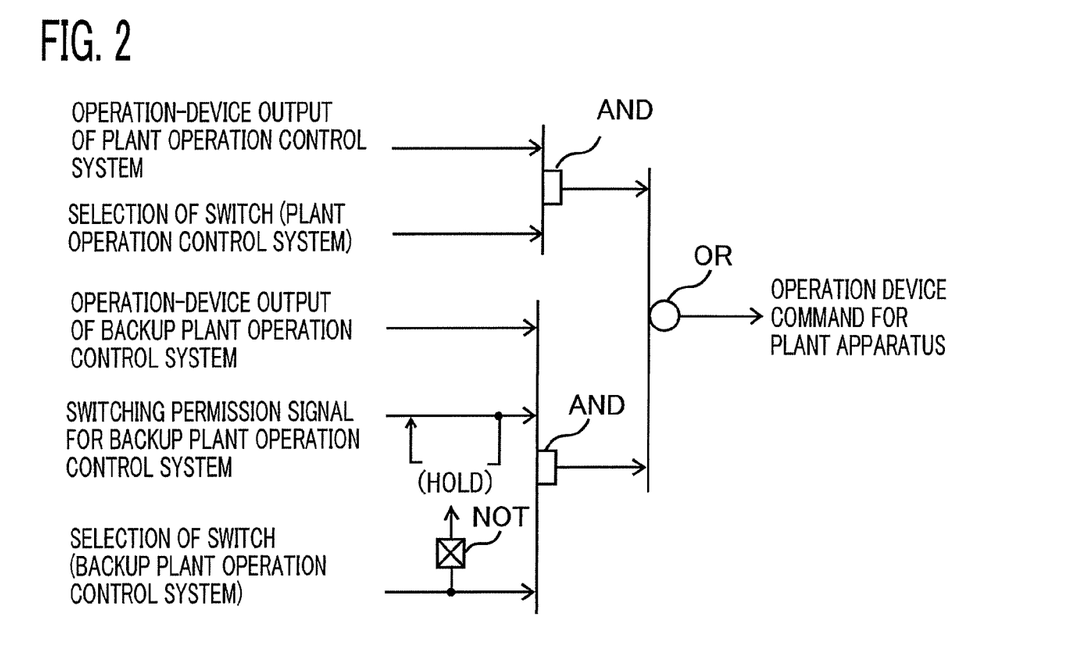
FIG. 2 is a diagram illustrating the switching concept of a switching device utilized in the present invention.
Figure 3:
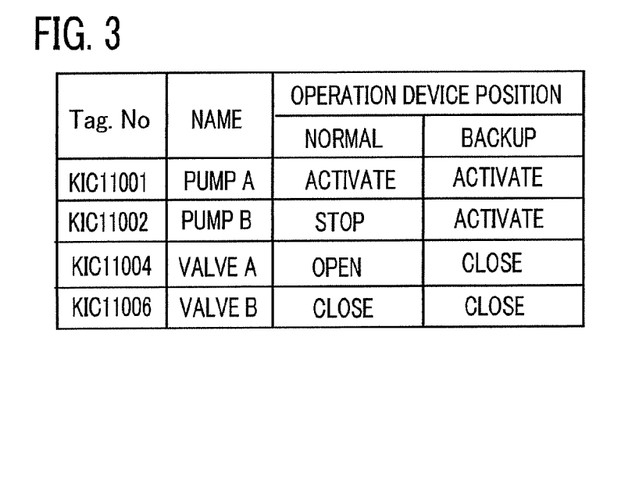
FIG. 3 is a view illustrating an example of display image of a display device in Embodiment 1 of the present invention.

A plant operation system according to Embodiment 1 of the present invention will be explained below with reference to the accompanying drawings. FIG. 1 is a diagram illustrating an overall configuration of Embodiment 1 of the present invention; FIG. 2 is a diagram illustrating the switching concept of a switching device utilized in the present invention; FIG. 3 is a view illustrating an example of display image of a display device in Embodiment 1 of the present invention.

As illustrated in FIG. 1 which is a diagram illustrating an overall configuration, a plant operation system according to the present invention is configured with a plant operation control system 1 that is utilized when a plant is normally operated, a backup plant operation control system 2 that is utilized in such a way as to replace the plant operation control system 1 when the plant operation control system 1 fails, a switching device 3 that performs switching between the plant operation control system 1 and the backup plant operation control system 2, and an operation device position monitoring apparatus 4 that monitors the positions of the respective operation devices of the plant operation control system 1 and the backup plant operation control system 2.

In the plant operation control system 1, there are provided a plurality of operation devices 11 (only one operation device is illustrated in FIG. 1) that control a plurality of plant apparatuses 5 such as a pump, a valve, and a heater; and an input/output circuit 12 that outputs data on the position (activate/stop, open/close, or the like) of the operation device 11 and transmits the data to the operation device position monitoring apparatus 4.

Additionally, as is the case with the plant operation control system 1, in the backup plant operation control system 2, there are provided a plurality of operation devices 21 (only one operation device is illustrated in FIG. 1) that control the plurality of plant apparatuses 5, and an input/output circuit 22 that outputs data on the position (activate/stop, open/close, or the like) of the operation device 21 and transmits the data to the operation device position monitoring apparatus 4.

The operation switches of the operation device 11 of the plant operation control system 1 are formed of software; as an example, an activation button 11a and a stop button 11b among a plurality of switches are selectively displayed on a display device such as a liquid crystal monitor. The operation switches of the operation device 21 of the backup plant operation control system 2 are formed of hardware, and hence a plurality of switches is provided.

The operation device 21 of the backup plant operation control system 2 may be formed of software the same as the software that forms the operation device 11 of the plant operation control system 1 for normal operation; however, in Embodiment 1, the operation device 21 of the backup plant operation control system 2 is deliberately formed of hardware. That is because, when, in a plant, like a nuclear plant, that requires secure safety and reliability, the operation device 21 of the backup plant operation control system 2 is formed of software similar to the software that forms the operation device 11 of the plant operation control system 1 for normal operation, in the case where the plant operation control system 1 fails, the probability that the backup plant operation control system 2 has the same failure is high, whereby the backup function is deteriorated. Accordingly, the operation device 21 of the backup plant operation control system 2 is formed of hardware.

The switching device 3 is configured with a switch 31 with which an operator implements switching between the plant operation control system 1 and the backup plant operation control system 2, and a switching circuit 32 that allows a control signal for the plant apparatus 5, outputted from the backup plant operation control system 2 via the switch 31, to pass, when a switching permission signal Sk, described later, outputted from the operation device position monitoring apparatus 4 is inputted thereto, so as to perform switching of the plant operation control system for controlling the plant apparatus 5 from the plant operation control system 1 to the backup plant operation control system 2.

The operation device position monitoring apparatus 4 is configured with an input/output circuit 41 that inputs data pieces, on the positions of the respective operation devices, which are outputted from the plant operation control system 1 and the backup plant operation control system 2; a position data storage unit 42, such as a memory, that stores data pieces, on the positions of the operation devices, outputted from the input/output circuit 41; a display device 43, such as a liquid-crystal panel, that displays the position data stored in the position data storage unit 42; and a processing device 44 that determines whether or not the operation device position data from the plant operation control system 1 is the same as the operation device position data from the backup plant operation control system 2 when the plant operation control system 1 is replaced by the backup plant operation control system 2, and outputs the switching permission signal Sk to the switching circuit 32 of the switching device 3 via the input/output circuit 41 in the case where the both operation device position data pieces are the same as each other.

Next, the operation of the plant operation system according to Embodiment 1 of the present invention will be explained with reference to FIGS. 1 to 3. FIG. 2 illustrates a logical switching concept of the switching device 3; the concept is configured with AND circuits and an OR circuit. FIG. 3 is an example of display image displayed on the display device 43.

In the first place, a case where normal operation is performed by the plant operation control system 1 will be explained. As illustrated in FIG. 1, an operator turns the switch 31 of the switching device 3 to the position for the plant operation control system 1. Next, in the case where the plant apparatus 5, i.e., a pump is activated or a valve is opened, the activation button 11a of the operation device 11 of the plant operation control system 1 is pressed. In the case where the plant apparatus 5, i.e., a pump is stopped or a valve is closed, the stop button 11b of the operation device 11 is pressed.

Accordingly, as illustrated in FIG. 2, the operation device 11 of the plant operation control system 1 outputs an operation signal, and the switch 31 is turned to the position for the plant operation control system 1; therefore, the output of the operation device of the plant operation control system 1 is outputted via the AND circuit illustrated at the top of FIG. 2 and the OR circuit, and hence the switching device 3 outputs the operation signal to the plant apparatus 5.

In addition, when the plant operation control system 1 performs normal operation, the switching circuit 32 of the switching device 3 is effective; thus, regardless of whether or not the switching permission signal Sk from the processing device 44 exists, a signal from the switch 31 is outputted.

In the case where the plant operation control system 1 performs the operation of the plant apparatus 5, data on the position (activate/stop, open/close, or the like) of the operation device 11 of the plant operation control system 1 is inputted in real time to the input/output circuit 41 of the operation device position monitoring apparatus 4 via the input/output circuit 12 and stored in the position data storage unit 42.

On the other hand, the backup plant operation control system 2 is always activated; in order to ascertain the healthiness thereof, the operation device 21 of the plant apparatus (a heater, a valve, a pump, or the like) is periodically operated through the backup plant operation control system 2, and at the same time, the condition of the operation device 21 is monitored. At that time, data on the position (activate/stop, open/close, or the like) of the operation device 21 of the backup plant operation control system 2 is inputted in real time to the input/output circuit 41 of the operation device position monitoring apparatus 4 via the input/output circuit 22 and stored in the position data storage unit 42.

As illustrated in FIG. 3, the display device 43 displays in real time the operation device position data, stored in the position data storage unit 42, for each plant apparatus 5. In other words, FIG. 3 designates each of the plant apparatuses 5 with "Tag No." and the name such as a pump or a valve, and represents the comparison between the respective operation device positions of the plant operation control system 1 for normal operation and the backup plant operation control system 2. In FIG. 3, there is represented the fact that, in a pump B and a valve A, the position of the operation device 22 of the backup plant operation control system 2 is different from the position upon normal operation. As a result, the operator can comprehend in real time in which plant apparatus 5 the operation device position of the backup plant operation control system 2 is different from the position upon normal operation.

Next, there will be explained a case where the plant operation control system 1 fails and is replaced by the backup plant operation control system 2. In the case where, when the plant operation control system 1 is replaced by the backup plant operation control system 2, the position of the operation device is different from the position upon normal operation, an effect against the plant operation may occur; thus, it is required to prevent the effect.

Accordingly, in the present invention, the plant operation control system 1 is replaced by the backup plant operation control system 2 under the condition that, when switching to the backup plant operation control system 2 is performed, all the positions of the operation devices are the same as those upon normal operation.

In the first place, the switch 31 of the switching device 3 is turned to the position for the backup plant operation control system 2 from the position illustrated in FIG. 3. At this moment, in the case where the position of the operation device is different from the position upon normal operation, the operation device position monitoring apparatus 4 does not output the switching permission signal Sk; therefore, the switching device 3 does not output to the plant apparatus 5 an operation device command from the backup plant operation control system 2.

When the switch 31 of the switching device 3 is turned to the position for the backup plant operation control system 2, the operator comprehends the plant apparatus 5 the operation device position for which changes depending on whether the operation is normal operation or backup operation, based on the position statuses of the operation device displayed on the display device 43, and operates the operation device 21 of the plant apparatus 5 the operation device position for which is different from the position upon normal operation so as to make the operation device position the same as the position upon normal operation. For example, the statuses displayed in FIG. 3 represent that, in the pump B and the valve A, the operation device position changes depending on whether the operation is normal operation or backup operation; therefore, the operator operates the operation devices 21 of the pump B and the valve A so as to make the operation device positions the same as the positions upon normal operation.

As a result, when the positions of the operation devices 21 of all of the plant apparatuses 5 have become the same as those upon normal operation, the processing device 44 of the operation device position monitoring apparatus 4 outputs the switching permission signal Sk. The switching permission signal Sk is inputted to the switching circuit 32 of the switching device 3.

As illustrated in FIG. 2, the operation device 21 of the backup plant operation control system 2 outputs an operation signal; the switch 31 is turned to the position for the backup plant operation control system 2; and the processing device 44 outputs the switching permission signal Sk. Therefore, switching device 3 outputs to the plant apparatus 5 an operation command from the operation device of the backup plant operation control system 2, via the AND circuit illustrated at the bottom of FIG. 2 and the OR circuit. While the switch 31 is at the position for the backup plant operation control system 2, the switching permission signal Sk is held by a HOLD circuit; in the case where the switch 31 is no longer at the position for the backup plant operation control system 2, a NOT circuit cancels the holding of the switching permission signal Sk.

In addition, in the case where the operation device position status displayed on the display device 43 changes depending on whether the operation is normal operation or backup operation, by making the color of characters (e.g., in the case where the operation statuses are the same as each other, black characters are utilized, and in the case where the operation statuses are different from each other, red characters are utilized) change depending on whether the operation is normal operation or backup operation, the operator can readily comprehend the plant apparatus 5 the operation device position for which changes depending on whether the operation is normal operation or backup operation.

As described above, according to Embodiment 1 of the present invention, an operator can comprehend in real time that the operation device position of the backup plant operation control system 2 is different from the position upon normal operation. Moreover, in the case where the operation device position of the backup plant operation control system 2 is different from the position upon normal operation, the switch 31 of the switching device 3 cannot be turned to the position for the backup plant operation control system 2; therefore, it is made possible to avoid such an effect as deterioration in the plant output.

Embodiment 2

Figure 4:
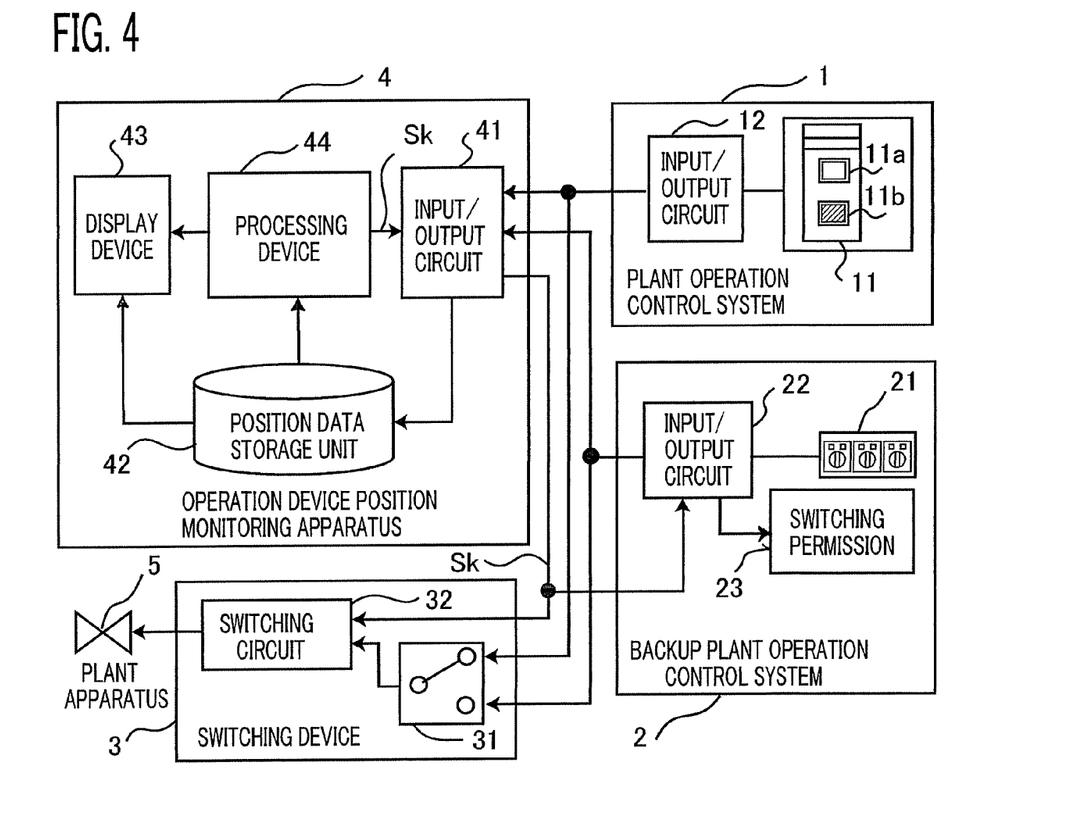
FIG. 4 is a diagram illustrating an overall configuration of Embodiment 2 of the present invention.
Figure 5:
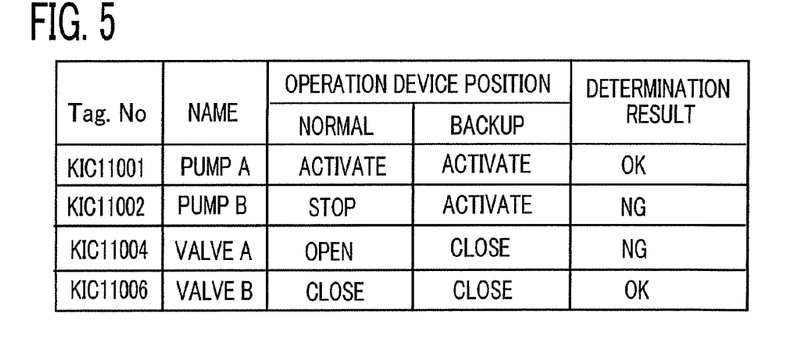
FIG. 5 is a view illustrating an example of display image of a display device in Embodiment 2 of the present invention.

Next, a plant operation system according to Embodiment 2 of the present invention will be explained with reference to the accompanying drawings. FIG. 4 is a diagram illustrating an overall configuration of Embodiment 2 of the present invention; FIG. 5 is a view illustrating an example of display image of a display device in Embodiment 2 of the present invention.

In the overall-configuration diagram illustrated in FIG. 4, the processing device 44 of the operation device position monitoring apparatus 4 determines whether data pieces on the positions of the respective operation devices of the plant operation control system 1 and the backup plant operation control system 2 are the same as each other; when the data pieces become the same as each other, the processing device 44 outputs the switching permission signal Sk to the switching circuit 32 of the switching device 3, and outputs the result of the determination to the display device 43. Additionally, in the backup plant operation control system 2, there is provided a switching permission indication lamp 23 that indicates that switching is permitted, when the switching permission signal Sk is outputted from the processing device 44. Other configurations are the same as those in Embodiment 1 illustrated in FIG. 1; thus, the same constituent elements are designated by the same reference characters, and the explanations therefor will be omitted.

Next, the operation of a plant operation system according to Embodiment 2 of the present invention will be explained with reference to FIGS. 4 and 5.

In the case where normal operation is performed by the plant operation control system 1, the operation is the same as that in Embodiment 1. There will be explained a case where the plant operation control system 1 fails and is replaced by the backup plant operation control system 2.

In the first place, the switch 31 of the switching device 3 is turned to the position for the backup plant operation control system 2 from the position illustrated in FIG. 4. At this moment, in the case where the position of the operation device is different from the position upon normal operation, the operation device position monitoring apparatus 4 does not output the switching permission signal Sk; therefore, the switching device 3 does not output to the plant apparatus 5 an operation device command from the backup plant operation control system 2.

The processing device 44 inputs to the display device 43 the result of a determination whether data pieces on the positions of the respective operation devices of the plant operation control system 1 and the backup plant operation control system 2 are the same as each other. As represented in FIG. 5, on the display screen of the display device 43, the result of the determination for each plant apparatus 5 is displayed, i.e., in the case where the data pieces are the same as each other, "OK" is displayed, and in the case where the data pieces are different from each other, "NG" is displayed.

When the switch is turned to the position for the backup plant operation control system 2, an operator comprehends the plant apparatus 5 with "NG", based on the result, of determination on the operation device positions, displayed on the display device 43, and operates the operation device 21 of the plant apparatus 5 the operation device position for which is different from the position upon normal operation so as to make the operation device position the same as the position upon normal operation. For example, the statuses displayed in FIG. 5 represent that, in the pump B and the valve A, the operation device position changes depending on whether the operation is normal operation or backup operation; therefore, the operator operates the operation devices 21 of the pump B and the valve A so as to make the operation device positions the same as the positions upon normal operation.

As a result, when the positions of the operation devices 21 of all of the plant apparatuses 5 have become the same as those upon normal operation, the processing device 44 of the operation device position monitoring apparatus 4 outputs the switching permission signal Sk. The switching permission signal Sk is inputted to the switching circuit 32 of the switching device 3.

Additionally, the switching permission signal Sk from the processing device 44 is also outputted to the backup plant operation control system 2, and the switching permission indication lamp 23 is lit so as to indicate that switching is permitted.

As is the case with Embodiment 1, the operation device 21 of the backup plant operation control system 2 outputs a control signal; the switch 31 is turned to the position for the backup plant operation control system 2; and the processing device 44 outputs the switching permission signal Sk. Accordingly, the switching device 3 outputs to the plant apparatus 5 an operation command from the operation device of the backup plant operation control system 2.

In addition, in the case where the determination result displayed on the display device 43 is "NG", characters whose colors (e.g., in the case of "OK", black characters are utilized, and in the case of "NG", red characters are utilized) are different from those in the case where the result of the determination is "OK" are utilized, so that the operator can readily comprehend the plant apparatus 5 the operation device position for which changes depending on whether the operation is normal operation or backup operation.

As described above, according to Embodiment 2 of the present invention, just by looking at the determination result displayed on the display device 43, an operator can readily comprehend that the operation device position of the backup plant operation control system 2 is different from the position upon normal operation; moreover, by checking the switching permission indication lamp 23 of the backup plant operation control system 2, the working time for ascertaining whether or not the switch may be turned to the position for the backup plant operation control system 2 can be shortened.

Embodiment 3

Figure 6:
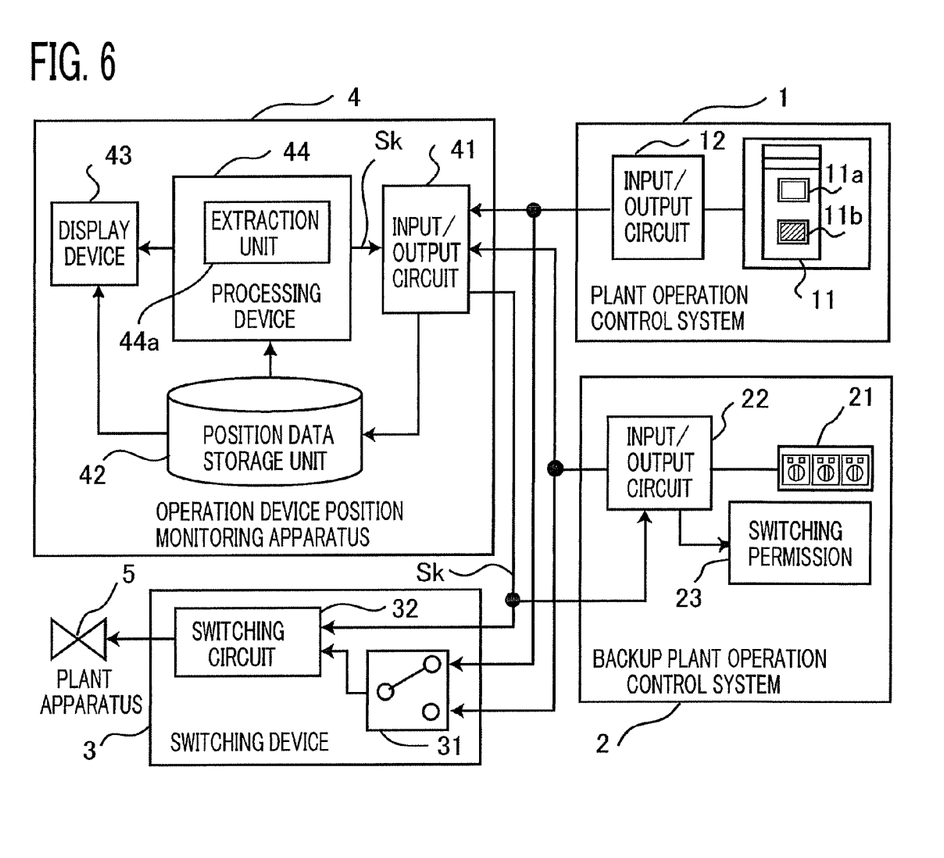
FIG. 6 is a diagram illustrating an overall configuration of Embodiment 3 of the present invention.
Figure 7:
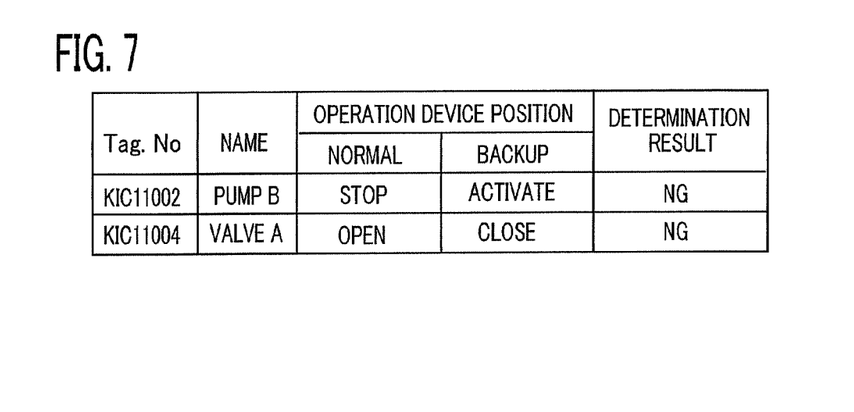
FIG. 7 is a view illustrating an example of display image of a display device in Embodiment 3 of the present invention.

Next, a plant operation system according to Embodiment 3 of the present invention will be explained with reference to the accompanying drawings. FIG. 6 is a diagram illustrating an overall configuration of Embodiment 3 of the present invention; FIG. 7 is a view illustrating an example of display image of a display device in Embodiment 3 of the present invention.

In Embodiment 2, the operation device positions of all the plant apparatuses are displayed on the display screen of the display device 43; however, in Embodiment 3, the processing device 44 extracts only the operation devices whose positions change depending on whether the operation of the plant is performed by the plant operation control system 1 or the backup plant operation control system 2, and the display device 43 displays only those operation devices.

In the overall-configuration diagram illustrated in FIG. 6, the processing device 44 determines whether the operation device positions change depending on whether the plant is operated by the plant operation control system 1 or the backup plant operation control system 2; there is provided an extraction unit 44a that extracts only the operation devices whose positions change depending on whether the plant is operated by the plant operation control system 1 or the backup plant operation control system 2; and the operation devices extracted in the extraction unit 44a is outputted to the display device 43, along with the result of the determination. As represented in FIG. 7, the display device 43 displays, as the display image, only the operation devices the result of the determination, by the processing device 44, with regard to which is "NG". Other configurations are the same as those in Embodiment 2 illustrated in FIG. 4; thus, the same constituent elements are designated by the same reference characters, and the explanations therefor will be omitted.

Next, the operation of a plant operation system according to Embodiment 4 of the present invention will be explained with reference to FIGS. 6 and 7.

In the case where normal operation is performed by the plant operation control system 1, the operation is the same as that in Embodiment 1. There will be explained a case where the plant operation control system 1 fails and is replaced by the backup plant operation control system 2.

In the first place, the switch 31 of the switching device 3 is turned to the position for the backup plant operation control system 2 from the position illustrated in FIG. 4. At this moment, in the case where the position of the operation device is different from the position upon normal operation, the operation device position monitoring apparatus 4 does not output the switching permission signal Sk; therefore, the switching device 3 does not output to the plant apparatus 5 an operation device command from the backup plant operation control system 2.

The processing device 44 inputs to the display device 43 the determination results with regard to only the operation devices whose operation device positions change depending on whether the plant is operated by the plant operation control system 1 or the backup plant operation control system 2. Accordingly, as represented in FIG. 7, on the display screen of the display device 43, the names of the operation devices of the plant apparatuses whose operation device positions change depending on whether the plant is operated by the plant operation control system 1 or the backup plant operation control system 2, the operation device positions, and the determination results "NG"s are displayed.

When the switch is turned to the position for the backup plant operation control system 2, an operator comprehends of the operation device of the plant apparatus 5 with "NG" displayed on the display device 43, and operates the operation device 21 of the plant apparatus 5 the operation device position for which is different from the position upon normal operation so as to make the operation device position the same as the position upon normal operation.

After that, as is the case with Embodiment 2, when the positions of the operation devices 21 of all of the plant apparatuses 5 have become the same as those upon normal operation, the processing device 44 of the operation device position monitoring apparatus 4 outputs the switching permission signal Sk, and the switching permission indication lamp 23 is lit so as to indicate that switching is permitted. After that, the switching device 3 outputs to the plant apparatus 5 an operation command from the operation device of the backup plant operation control system 2.

As described above, according to Embodiment 3 of the present invention, just by looking at a display image displayed on the display device 43, an operator can readily comprehend an operation device whose position is different from the position upon normal operation; moreover, by checking the switching permission indication lamp 24 of the backup plant operation control system 2, the working time for ascertaining whether or not the switch may be turned to the position for the backup plant operation control system 2 can be shortened.

Embodiment 4

Figure 8:
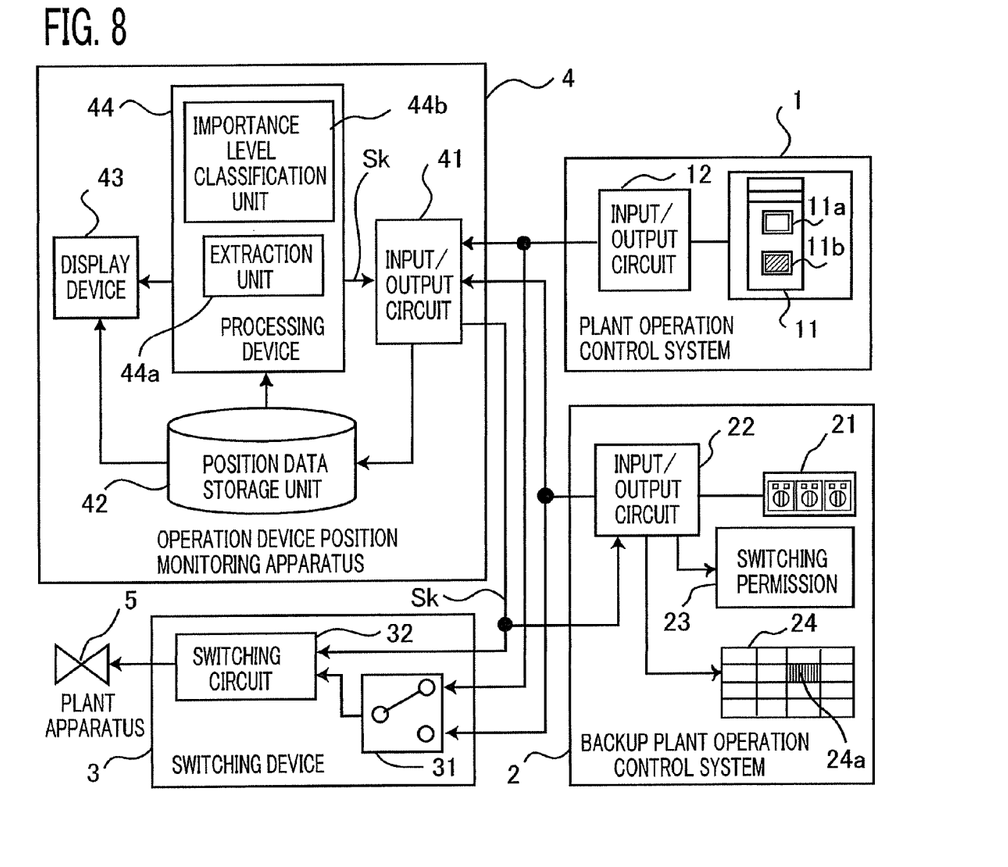
FIG. 8 is a diagram illustrating an overall configuration of Embodiment 4 of the present invention.
Figure 9:
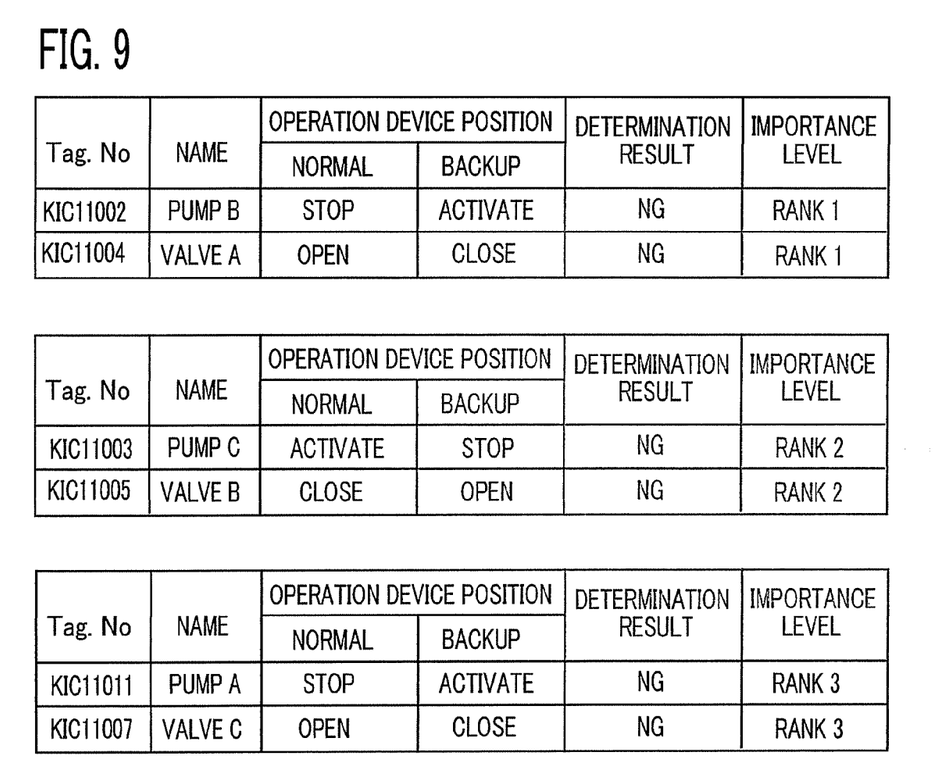
FIG. 9 is a view illustrating an example of display image of a display device in Embodiment 4 of the present invention.

Next, a plant operation system according to Embodiment 4 of the present invention will be explained with reference to the accompanying drawings. FIG. 8 is a diagram illustrating an overall configuration of Embodiment 4 of the present invention; FIG. 9 is a view illustrating an example of display image of a display device in Embodiment 4 of the present invention.

In the overall-configuration diagram illustrated in FIG. 8, the processing device 44 of the operation device position monitoring apparatus 4 has an importance level classification unit 44b; the operation devices, which are extracted by the extraction unit 44a because the data pieces on the operation device positions thereof change depending on whether the plant is operated by the plant operation control system 1 or the backup plant operation control system 2 and hence the results of determinations with regard to which are "NG", are classified in accordance with importance levels and outputted on the display device 43. Additionally, in the case where there exist an operation device with a high importance level in the operation devices the results of determinations with regard to which are "NG" because the data pieces on the operation device positions thereof change depending on whether the plant is operated by the plant operation control system 1 or the backup plant operation control system 2, the processing device 44 outputs an alarm signal to an alarm window 24 as an alarm means provided in the backup plant operation control system 2.

Other configurations are the same as those in Embodiment 3 illustrated in FIG. 6; thus, the same constituent elements are designated by the same reference characters, and the explanations therefor will be omitted.

Next, the operation of a plant operation system according to Embodiment 4 of the present invention will be explained with reference to FIGS. 8 and 9.

In the case where normal operation is performed by the plant operation control system 1, the operation is the same as that in Embodiment 1. There will be explained a case where the plant operation control system 1 fails and is replaced by the backup plant operation control system 2.

In the first place, the switch 31 of the switching device 3 is turned to the position for the backup plant operation control system 2 from the position illustrated in FIG. 4. At this moment, in the case where the position of the operation device is different from the position upon normal operation, the operation device position monitoring apparatus 4 does not output the switching permission signal Sk; therefore, the switching device 3 does not output to the plant apparatus 5 an operation device command from the backup plant operation control system 2.

For the display device 43, the extraction unit 44a of the processing device 44 extracts only the operation devices whose operation device positions change depending on whether the plant is operated by the plant operation control system 1 or the backup plant operation control system 2; moreover, the importance level classification unit 44b of the processing device 44 classifies the operation devices in accordance with important levels and inputs them to the display device 43. Accordingly, as represented in FIG. 9, on the display screen of the display device 43, the names of the operation devices of the plant apparatuses whose operation device positions change depending on whether the plant is operated by the plant operation control system 1 or the backup plant operation control system 2, the operation device positions, and the determination results "NG"s are classified in accordance with importance levels and displayed in descending order of the importance level (rank 1 to rank 3). Furthermore, the names of the operation devices, the operation device positions, and the determination results "NG"s are displayed with different colors in accordance with the importance levels, i.e., red characters, yellow characters, and green characters are utilized for the rank 1, the rank 2, and the rank 3, respectively.

Moreover, in the case where there exists an operation device with a high importance level (red display as rank 1), an alarm is outputted, for example, in such a way that a display 24*a*, within the alarm window 24 provided in the backup plant operation control system 2, which represents that the operation device position is different from the normal position is lit via the input/output circuits 41 and 22.

When the switch is turned to the position for the backup plant operation control system 2, an operator comprehends of the operation device of the plant apparatus 5 with "NG" displayed on the display device 43, and operates, in descending order of the importance level, the operation devices 21 of the plant apparatuses 5 the operation device positions for which are different from the positions upon normal operation so as to make the operation device positions the same as those upon normal operation.

After that, as is the case with Embodiment 2, when the positions of the operation devices 21 of all of the plant apparatuses 5 have become the same as those upon normal operation, the processing device 44 of the operation device position monitoring apparatus 4 outputs the switching permission signal Sk, so that the switching permission indication lamp 23 is lit so as to indicate that switching is permitted. After that, the switching device 3 outputs to the plant apparatus 5 an operation command from the operation device of the backup plant operation control system 2.

As described above, according to Embodiment 4 of the present invention, by looking at a display image displayed on the display device 43, an operator can readily comprehend an operation device, with a high importance level, whose position is different from the position upon normal operation, whereby switching to the position for the operation device with a high importance level can instantaneously be carried out; moreover, by checking the alarm window 24 of the backup plant operation control system 2, the operator can comprehend that an operation device with a high importance level is in an operation state different from the normal operation state.

Various modifications and alterations of this invention will be apparent to those skilled in the art without departing from the scope and spirit of this invention, and it should be understood that this is not limited to the illustrative embodiments set forth herein.

What is claimed is:

1. A plant operation system comprising:
    a plant operation control system that includes a first plurality of operation devices for operating a plurality of plant apparatuses and outputs data on positions of the first plurality of operation devices;
    a backup plant operation control system that includes a second plurality of operation devices for operating the plurality of plant apparatuses and outputs data on positions of the second plurality of operation devices;
    a switching device that performs switching between the plant operation control system and the backup plant operation control system; and
    an operation device position monitoring apparatus that receives data, on positions of the first or the second plurality of operation devices outputted from the plant operation control system or the backup plant operation control system, respectively, and monitors statuses of the operation devices, wherein
    the operation device position monitoring apparatus includes
        a storage unit that stores data on positions of the first and the second plurality of operation devices,
        a display device that displays data on the positions stored in the storage unit, and
        a processing device that determines whether or not operation device position data from the plant operation control system is the same as operation device position data from the backup plant operation control system when the plant operation control system is replaced by the backup plant operation control system, and outputs a switching permission signal to the switching device in the case where the operation device position data from the plant operation control system and the operation device position data from the backup plant operation control system are the same as each other, said processing device further outputs to the display device a result of determination whether or not the operation device position data from the plant operation control system and the operation device position data from the backup plant operation control system are the same as each other, and the display device displays the result of determination.

2. The plant operation system according to claim 1, wherein operation switches of the first plurality of operation devices in the plant operation control system are formed of software, and operation switches of the second plurality of operation devices in the backup plant operation control system are formed of hardware.

3. A plant operation system comprising:
    a plant operation control system that includes a first plurality of operation devices for operating a plurality of plant apparatuses and outputs data on positions of the first plurality of operation devices;
    a backup plant operation control system that includes a second plurality of operation devices for operating the plurality of plant apparatuses and outputs data on positions of the second plurality of operation devices;
    a switching device that performs switching between the plant operation control system and the backup plant operation control system; and
    an operation device position monitoring apparatus that receives data, on positions of the first or the second plurality of operation devices outputted from the plant operation control system or the backup plant operation control system, respectively, and monitors statuses of the operation devices, wherein
    the operation device position monitoring apparatus includes
        a storage unit that stores data on positions of the first and the second plurality of operation devices,
        a display device that displays data on the positions stored in the storage unit, and
        a processing device that determines if operation device position data from the plant operation control system is the same as operation device position data from the backup plant operation control system when the plant operation control system is replaced by the backup plant operation control system and outputs a switching permission signal to the switching device when the operation device position data from the plant operation control system and the operation device position data from the backup plant operation control system are the same as each other, said processing device further extracts an operation device, position data on which changes depending on whether the plant operation control system operates a plant or the backup plant operation control system operates the plant, and outputs the extracted operation device to the display device that displays the extracted operation device.

4. The plant operation system according to claim 3, wherein operation switches of the first plurality of operation devices in the plant operation control system are formed of software, and operation switches of the second plurality of operation devices in the backup plant operation control system are formed of hardware.

5. A plant operation system comprising:
   a plant operation control system that includes a first plurality of operation devices for operating a plurality of plant apparatuses and outputs data on positions of the first plurality of operation devices;
   a backup plant operation control system that includes a second plurality of operation devices for operating the plurality of plant apparatuses and outputs data on positions of the second plurality of operation devices;
   a switching device that performs switching between the plant operation control system and the backup plant operation control system; and
   an operation device position monitoring apparatus that receives data, on positions of the first or the second plurality of operation devices outputted from the plant operation control system or the backup plant operation control system, respectively, and monitors statuses of the operation devices, wherein
   the operation device position monitoring apparatus includes
      a storage unit that stores data on positions of the first and the second plurality of operation devices,
      a display device that displays data on the positions stored in the storage unit, and
      a processing device that determines whether or not operation device position data from the plant operation control system is the same as operation device position data from the backup plant operation control system when the plant operation control system is replaced by the backup plant operation control system, and outputs a switching permission signal to the switching device in the case where the operation device position data from the plant operation control system and the operation device position data from the backup plant operation control s stem are the same as each other, said processing device further extracts an operation device, position data on which changes depending on whether the plant operation control system operates a plant or the backup plant operation control system operates the plant, and classifies the extracted operation device in accordance with an importance level thereof and outputs the classified operation device to the display device that displays the classified operation device in accordance with the importance level.

6. The plant operation system according to claim 5, wherein, in the case where an operation device with a high importance level is extracted, the processing device outputs an alarm signal to an alarm means provided in the backup plant operation control system.

7. The plant operation system according to claim 5, wherein operation switches of the first plurality of operation devices in the plant operation control system are formed of software, and operation switches of the second plurality of operation devices in the backup plant operation control system are formed of hardware.

* * * * *